(12) United States Patent
Fukaya et al.

(10) Patent No.: US 10,088,631 B1
(45) Date of Patent: Oct. 2, 2018

(54) OPTICAL MODULE PACKAGE

(71) Applicant: SAE Magnetics (H.K.) Ltd., Hong Kong (CN)

(72) Inventors: Hiroshi Fukaya, Hong Kong (CN); Masanori Goto, Hong Kong (CN)

(73) Assignee: CLOUD LIGHT TECHNOLOGY LIMITED, Hong Kong (CN)

( * ) Notice: Subject to any disclaimer, the term of this patent is extended or adjusted under 35 U.S.C. 154(b) by 0 days.

(21) Appl. No.: 15/664,386

(22) Filed: Jul. 31, 2017

(30) Foreign Application Priority Data

Jun. 8, 2017 (CN) ...................... 2017 2 0664417 U

(51) Int. Cl.
| | |
|---|---|
| *G02B 6/38* | (2006.01) |
| *G02B 6/30* | (2006.01) |
| *G02B 6/36* | (2006.01) |

(52) U.S. Cl.
CPC ............. *G02B 6/30* (2013.01); *G02B 6/3616* (2013.01)

(58) Field of Classification Search
USPC ...................................................... 385/49–51
See application file for complete search history.

(56) References Cited

U.S. PATENT DOCUMENTS 9,033,591 B2 * 5/2015 Hikosaka ................. G02B 6/38
385/76

FOREIGN PATENT DOCUMENTS

| JP | 08-286075 | 11/1996 |
|---|---|---|
| JP | 2005-010508 | 1/2005 |

* cited by examiner

*Primary Examiner* — Eric Wong
(74) *Attorney, Agent, or Firm* — Nixon & Vanderhye PC

(57) ABSTRACT

An optical module package has a first case, a second case and a fiber unit. The first case has a case bottom-part formed along the length direction of the fiber unit, a bottom convex-part formed on the case bottom-part so as to project toward inside direction of the first case and an elastic support part made of elastic member and covering the bottom convex-part. The optical waveguide device is supported by the elastic support part and the optical fiber is arranged at the distant position from the elastic support part.

13 Claims, 23 Drawing Sheets

OPTICAL MODULE PACKAGE

This application claims priority to CN Utility Model Application No. 201720664417.7 filed Jun. 8, 2017, the entire contents of each of which are hereby incorporated by reference.

BACKGROUND

Field of the Invention

The present invention relates to an optical module package in which a fiber unit including an optical waveguide device and an optical fiber connected to each other is accommodated in a housing.

Related Background Art

There is conventionally known optical module packages in which an optical waveguide device, formed with a plurality of branched optical waveguides, is connected with an optical fiber and they are accommodated in a housing.

Conventionally, the optical module packages, which an elastic member and the fiber unit are accommodated in the housing, are known (see for example, JP Patent laid-open Publication 2005-10508 (also referred to as Patent Document 1), JP Patent laid-open Publication H8-286075 (also referred to as Patent Document 2). In such optical module packages, because the elastic member is intervened between the fiber unit and the housing, vibration and shock, which reach the fiber unit, are reduced by the elastic member.

SUMMARY OF THE INVENTION

However, the conventional optical module packages, disclosed in each patent document, have following problems because the elastic members are accommodated in the housings.

The elastic members which are accommodated in the housings repeat expansions and shrinkages, when the optical module packages are exposed to the change in the environment, which high-temperature, high humidity and low-temperature, low humidity (hereinafter referred to also "temperature-humidity cycle") are repeated. A load by the pressure and so on is brought to the fiber unit because of the expansions and shrinkages of the elastic members, transformation and/or breakage sometimes occur in the fiber unit. Further, there is a problem that an insertion loss of optical increases because of position displacement in the optical waveguide device and optical fiber in the fiber unit.

The present invention is made to solve the above problem, and its object is that not only the vibration and shock which reaches the fiber unit are decreased by the elastic member in the housing but also the load caused by the temperature-humidity cycle is decreased, thereby an increase of the transformation, breakage and insertion loss of the fiber unit is suppressed, in the optical module packages which the fiber unit is accommodated in the housing.

To solve the above problem, the present invention is an optical module package in which an optical waveguide device formed with an optical waveguide and an optical fiber are accommodated in a housing, the housing including: a first case which a fiber unit is accommodated, the fiber unit is constituted by connecting the optical fiber with the optical waveguide device; and a second case which covers the first case; the first case has a case bottom-part formed along the length direction of the fiber unit, a bottom convex-part being formed on the case bottom-part so as to project toward inside direction of the first case, and an elastic support part made of elastic member and covering the bottom convex-part, the optical waveguide device is supported by the elastic support part and the optical fiber is arranged at the distant position from the elastic support part.

Further, in case of the above-described optical module package, it is preferable that the bottom convex-part has a top-end-part projecting most inside the first case, a part of the elastic support part is arranged between the top-end-part and the optical waveguide device.

Further, it is preferable that the bottom convex-parts are arranged in three places of both sides along with the length direction of the first case and about the center, and the elastic support part covers the bottom convex-part arranged in about the center, the first case further includes side elastic support parts, made of elastic member, which cover the bottom convex-parts arranged in the both sides.

It is preferable that the bottom convex-part has a slanting-side-part which connects the top-end-part and the case bottom-part, the slanting-side-part is formed so that the interior angle between the slanting-side-part and the case bottom-part is acute angle.

It is preferable that the bottom convex-part has a hole-opening structure which a hole part is formed at the top-end-part or the slanting-side-part, the elastic support part has an elastic slanting-side-part corresponding to the slanting-side-part, and the elastic support part has a unified structure which it is unified with the bottom convex-part by injection molding via the hole part.

It is preferable that the first case has an opening, which a part of the case bottom-part is opened, formed in the position adjacent to the bottom convex-part, the elastic support part has a unified structure which it is unified with the bottom convex-part by injection molding via the opening.

Further, it is preferable that the first case has a case hole-opening structure which a hole part is formed at the case bottom-part, the elastic support part and the side elastic support parts have unified structures which they are unified with the bottom convex-parts by injection molding via the hole parts.

It is possible that the second case has a case peak-part formed along the length direction of the fiber unit, a peak convex-part formed on the case peak-part so as to project toward inside direction of the second case and an elastic cover part made of elastic member and covering the peak convex-part, the optical waveguide device is in contact with the elastic cover part and the optical fiber is arranged at the distant position from the elastic cover part.

It is possible that the peak convex-parts are arranged in three places of both sides along with the length direction of the second case and about the center, and the elastic cover part covers the peak convex-part arranged in about the center, the second case further includes side elastic cover parts, made of elastic member, which cover the peak convex-parts arranged in the both sides.

In case of the above-described optical module package, it is preferable that the side elastic support part and the side elastic cover part respectively have optical fiber holding surfaces formed flatly and fiber concave parts formed with shape corresponding to the optical fiber, and formed at the optical fiber holding surfaces.

Further, it is preferable that the peak convex-part has a cover top-end-part projecting most inside the second case and a cover slanting-side-part connecting the cover top-end-part and the case peak-part, the cover slanting-side-part is formed so that the interior angle between the cover slanting-side-part and the case peak-part is acute angle.

Further, it is preferable that the elastic cover part has an elastic cover slanting-side-part corresponding to the cover slanting-side-part, and the elastic cover part has a unified structure which it is unified with the peak convex-part.

It is preferable that the peak convex-part has a hole-opening structure which a hole part is formed at the cover top-end-part or the cover slanting-side-part, the elastic cover part has a unified structure which it is unified with the peak convex-part by injection molding via the hole part.

As described above, by the present invention, not only the vibration and shock which reach the fiber unit are decreased by the elastic member in the housing but also the load caused by the temperature-humidity cycle is decreased, thereby an increase of the transformation, breakage and insertion loss of the fiber unit is suppressed, in the optical module packages which the fiber unit is accommodated in the housing.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structures of Optical Module Package)

Figure 1:
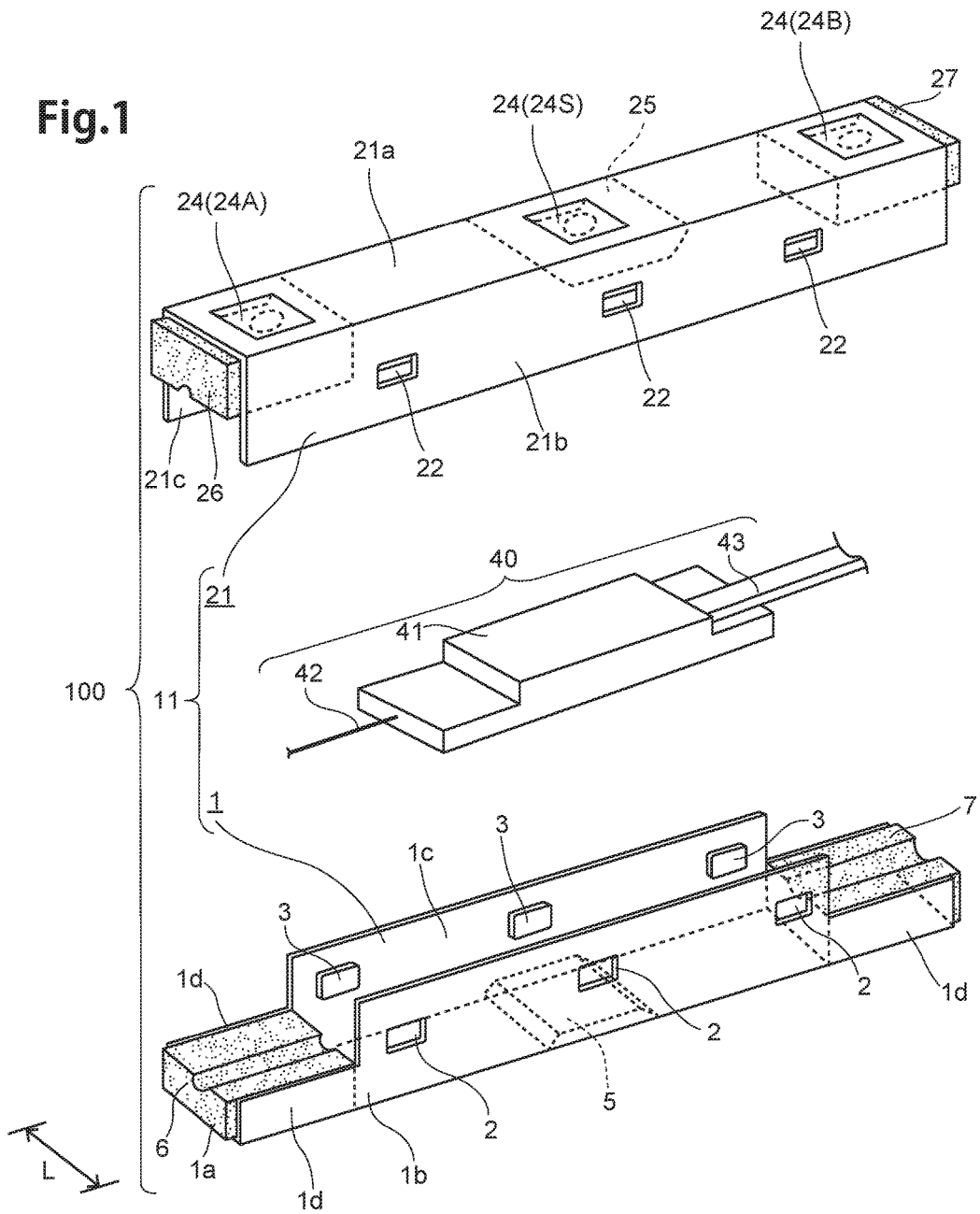
FIG. 1 is an exploded perspective view illustrating an optical module package according to an embodiment of the present invention.
Figure 2:
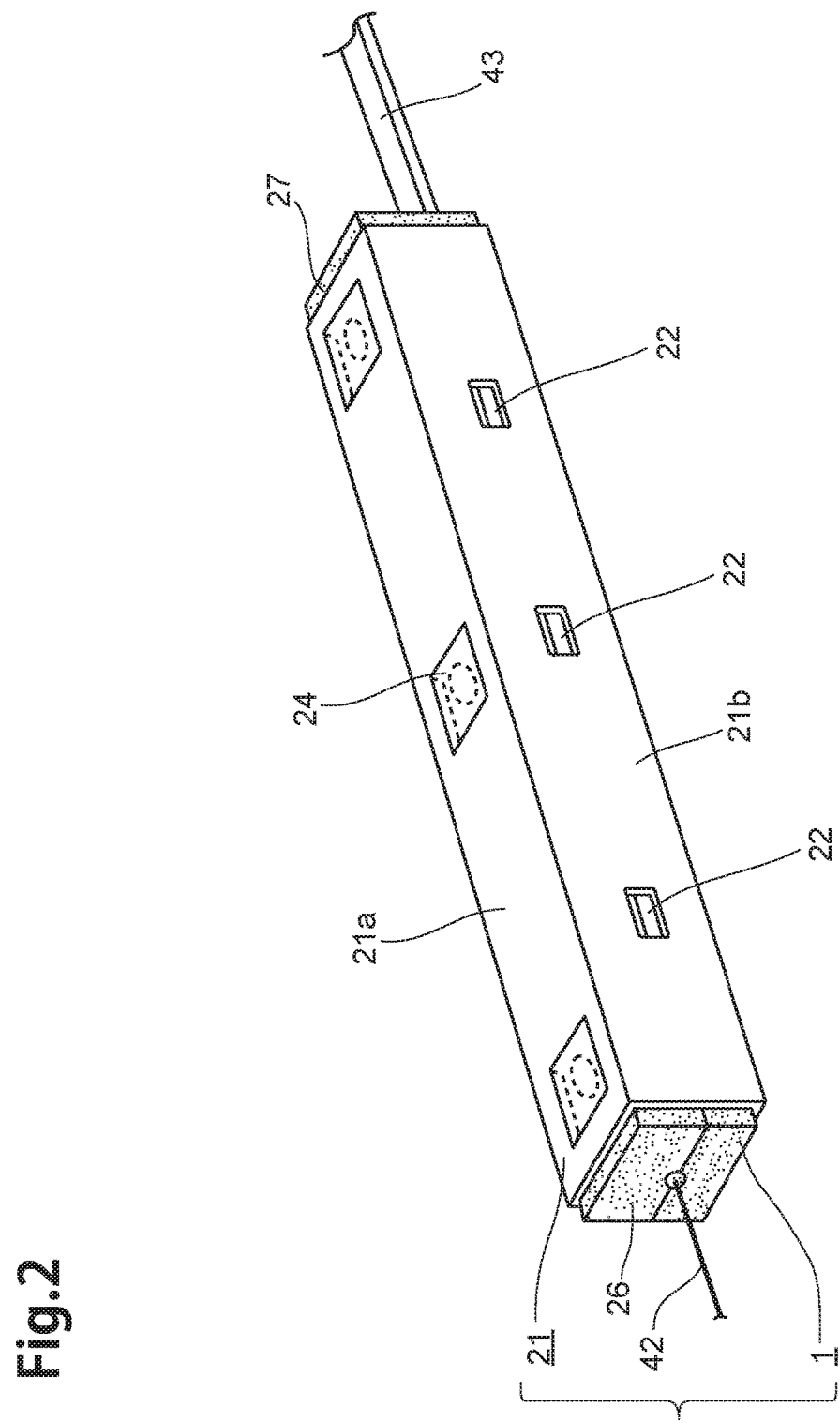
FIG. 2 is a perspective view illustrating the optical module package according to the embodiment of the present invention.
Figure 3:
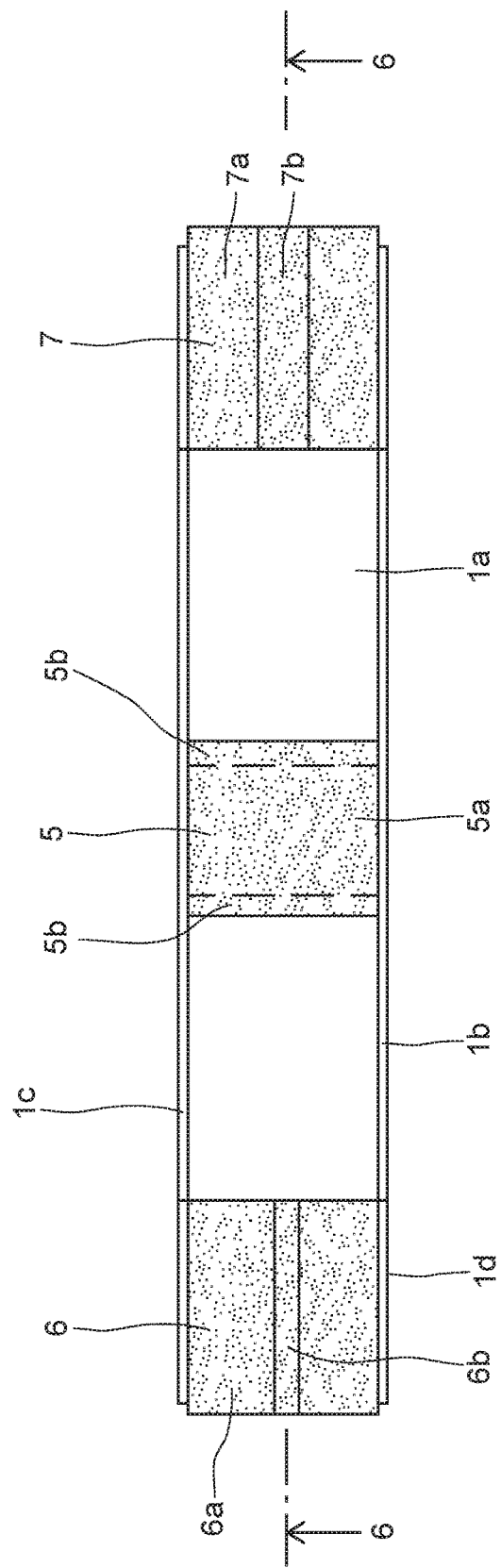
FIG. 3 is a plan view illustrating a bottom case.
Figure 4:
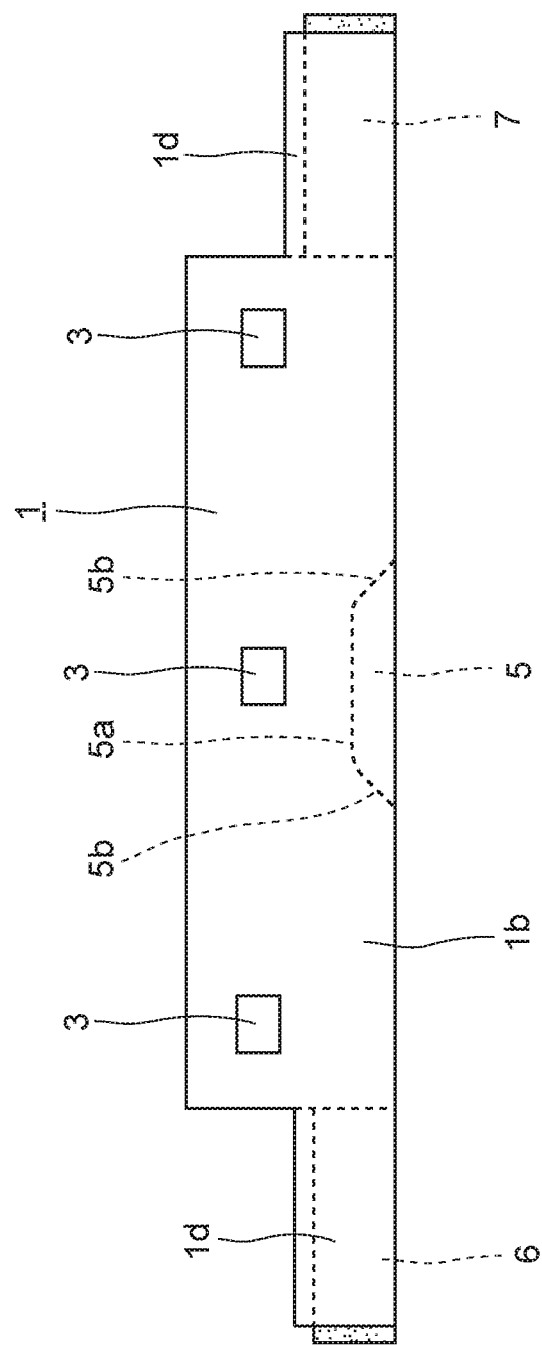
FIG. 4 is a right-side elevation view illustrating the bottom case.
Figure 5:
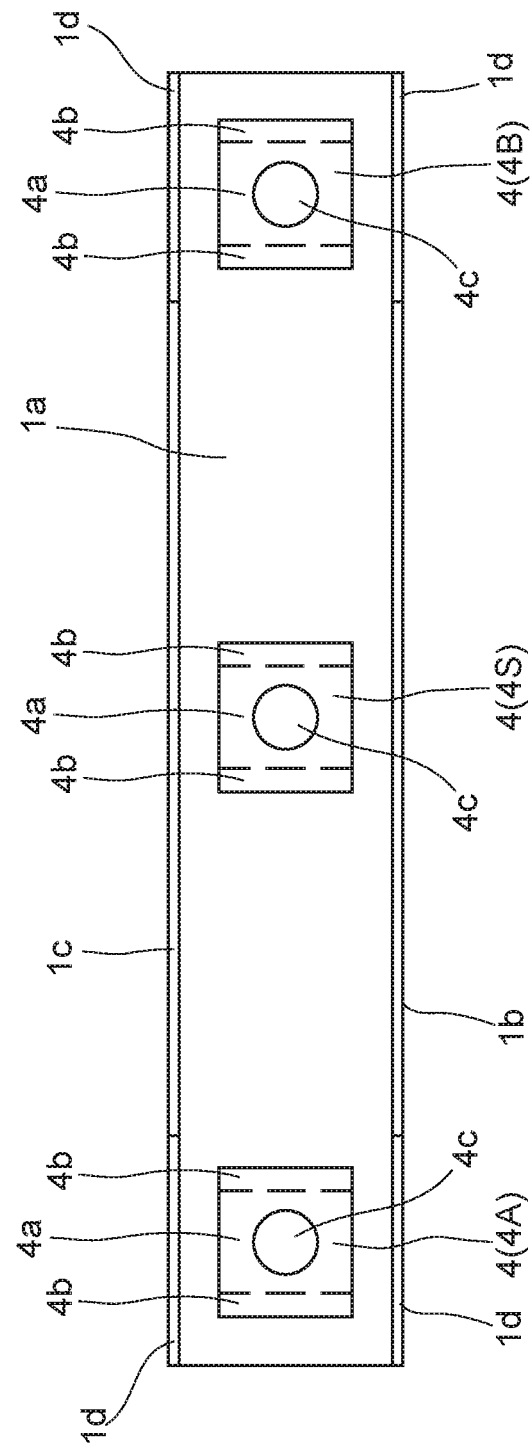
FIG. 5 is a plan view illustrating the bottom case in a state which an elastic support part, side elastic support parts are removed.
Figure 6:
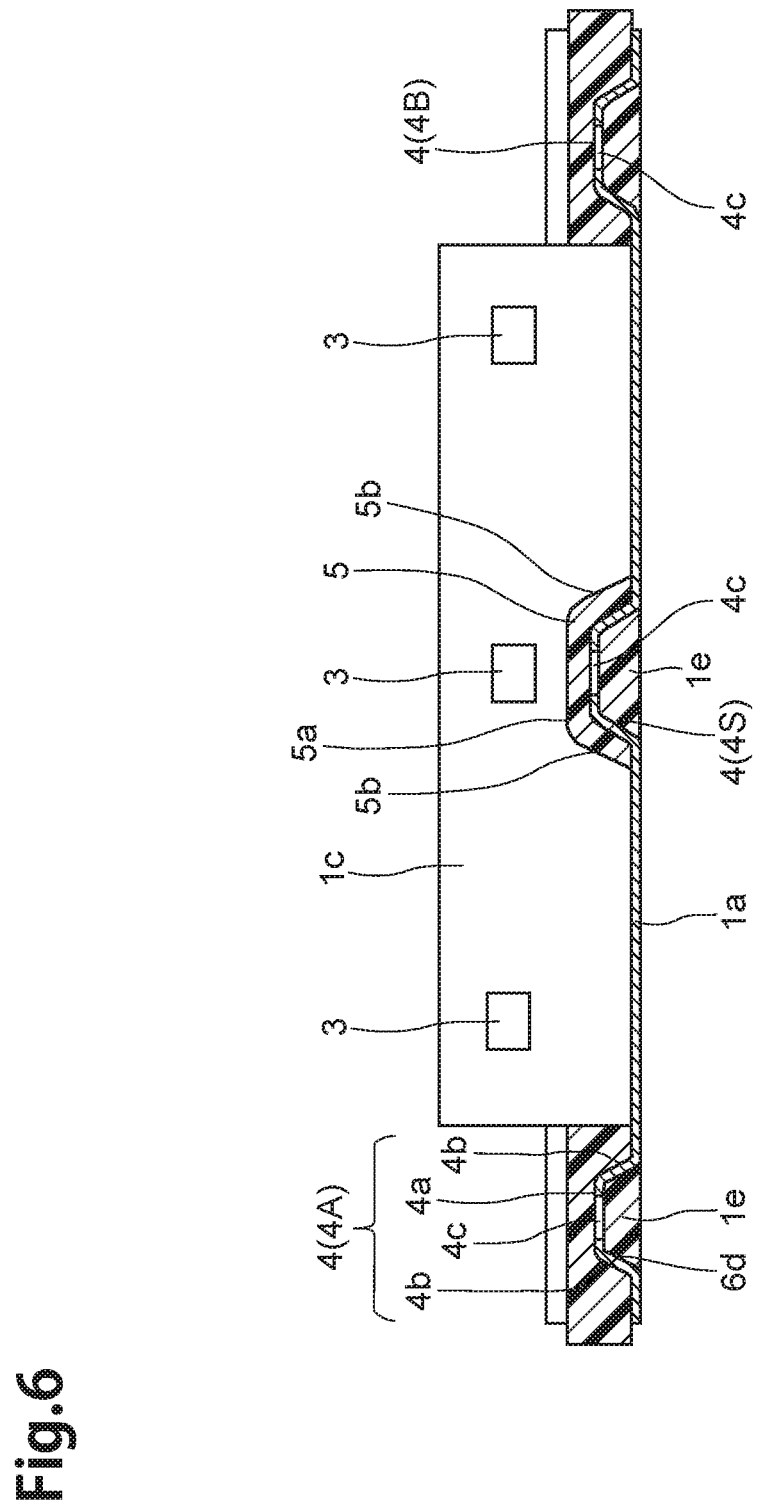
FIG. 6 is a sectional view taken along the line 6-6 in FIG. 3.
Figure 7:
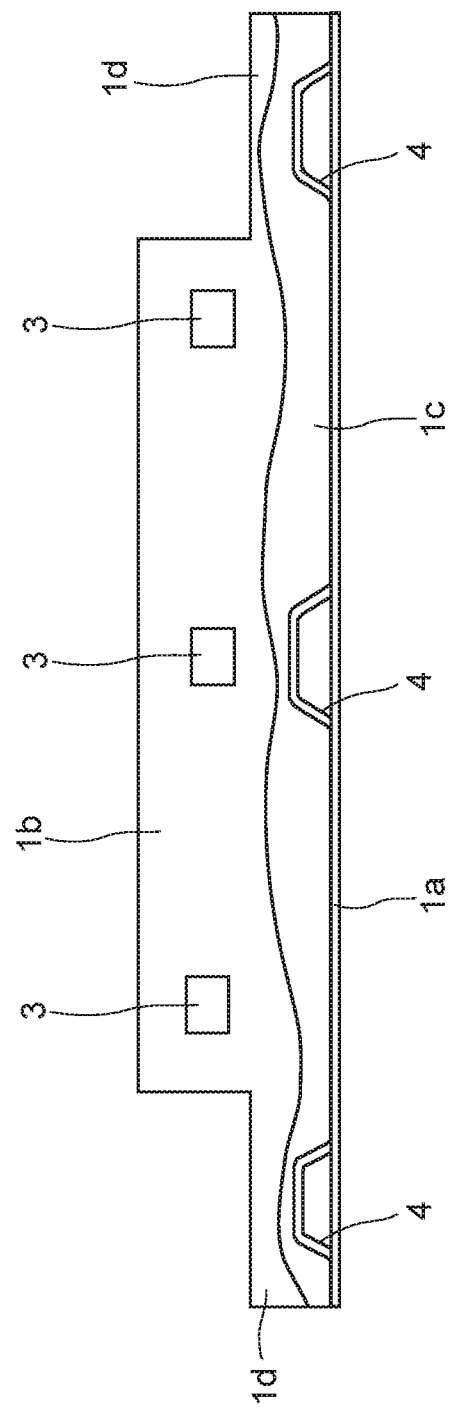
FIG. 7 is a right-side elevation view illustrating the bottom case which a part of a bottom wall part of right-side is omitted, in a state which the elastic support part, side elastic support parts are removed.
Figure 8:
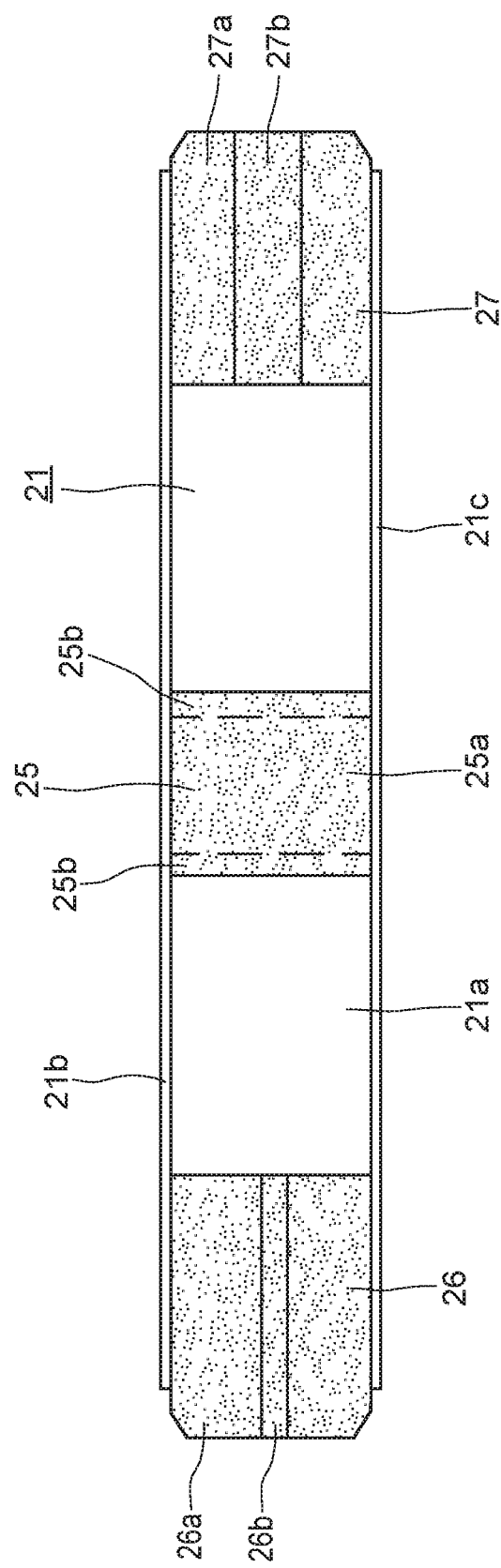
FIG. 8 is a bottom plan view illustrating a cover case.
Figure 9:
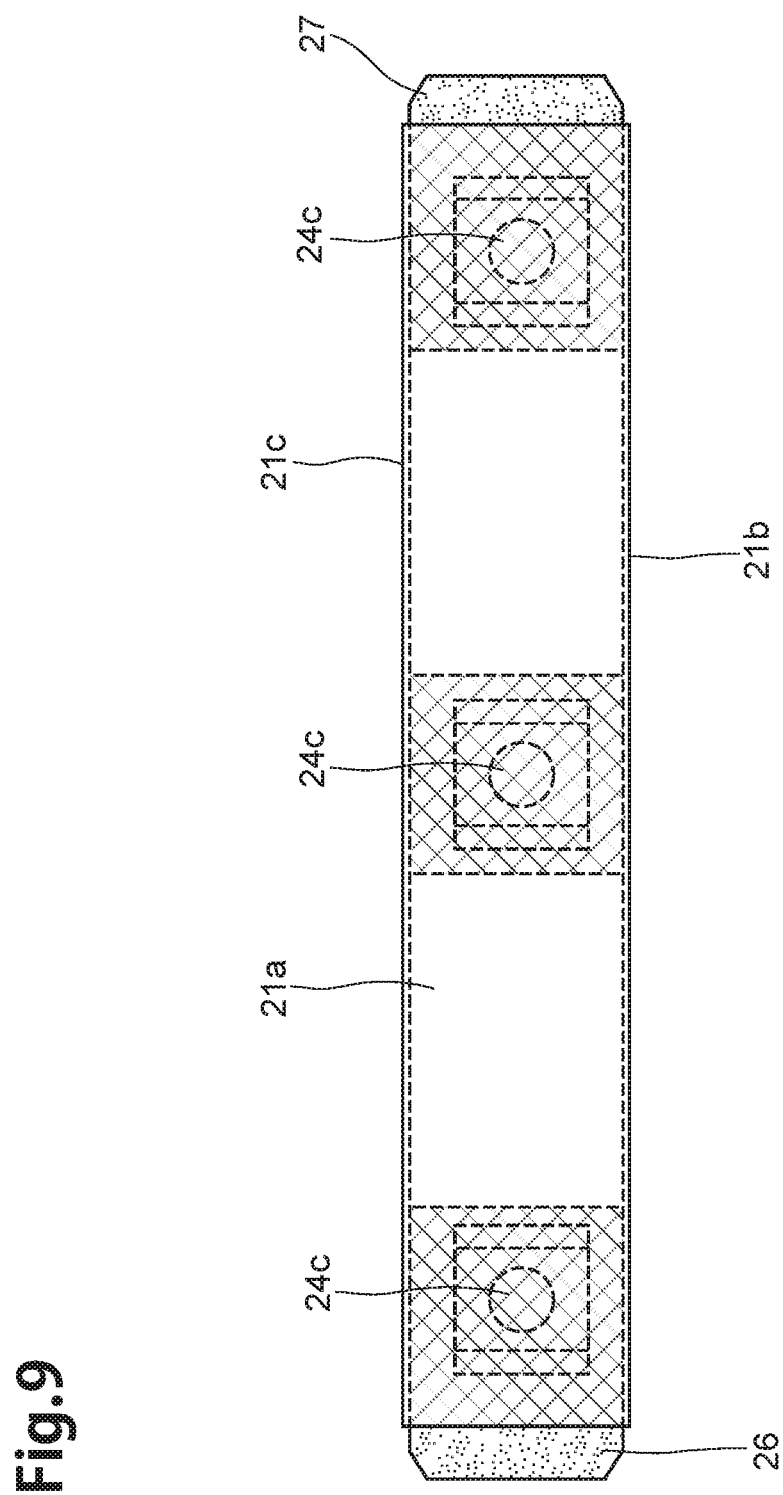
FIG. 9 is a plan view illustrating the cover case.
Figure 10:
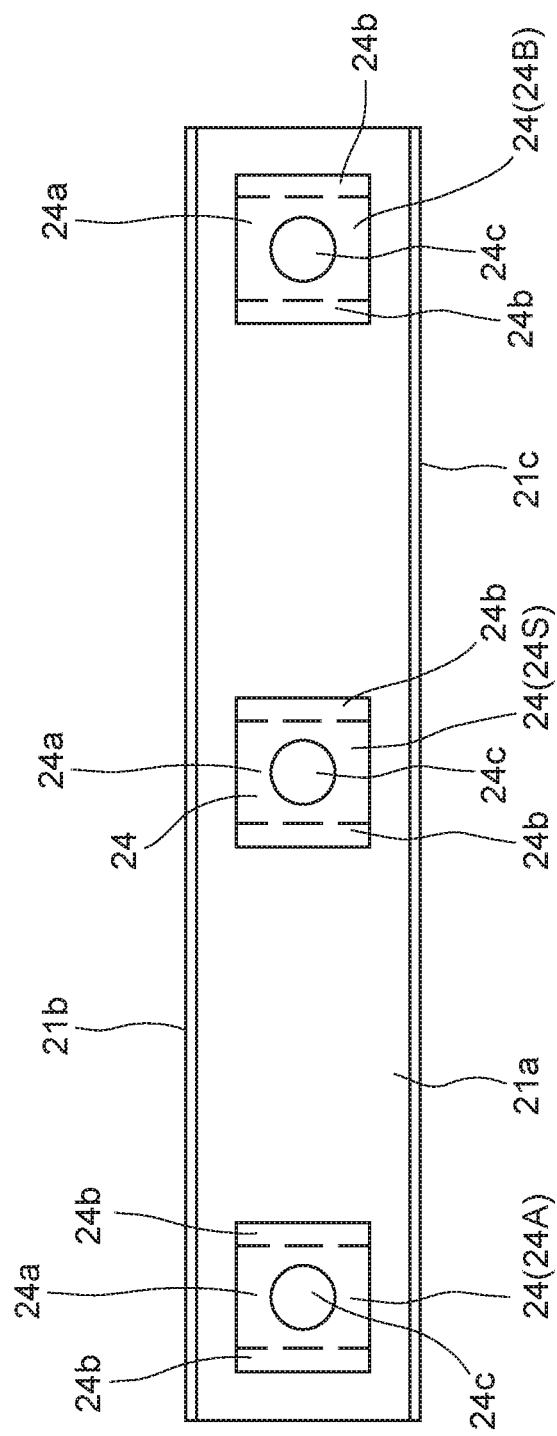
FIG. 10 is a bottom plan view illustrating the cover case in a state which an elastic cover part, side elastic cover parts are removed.
Figure 11:
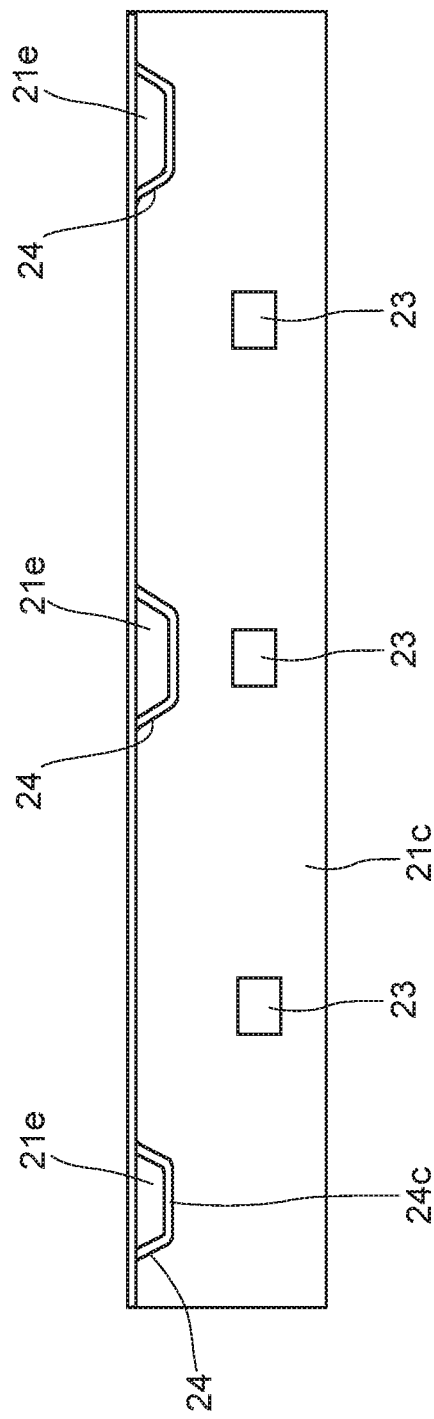
FIG. 11 is a right-side elevation view illustrating the cover case which a bottom wall part of right-side is omitted, in a state which elastic cover part, side elastic cover parts are removed.
Figure 12:
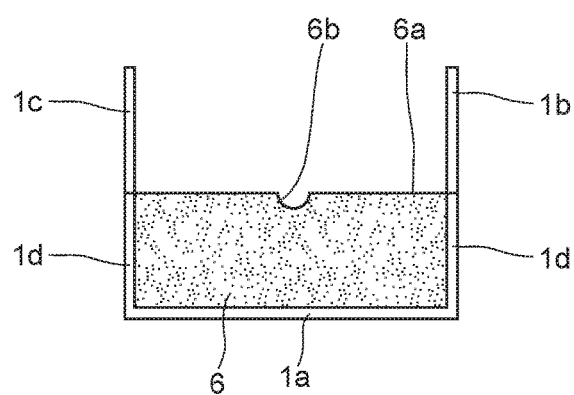
FIG. 12 is a front view illustrating the bottom case.
Figure 13:
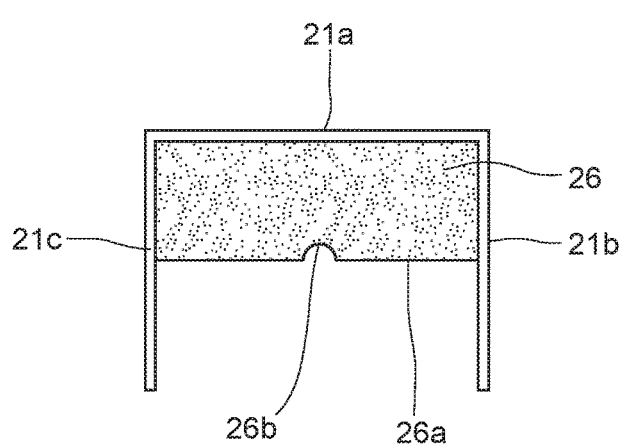
FIG. 13 is a front view illustrating the cover case.
Figure 14:
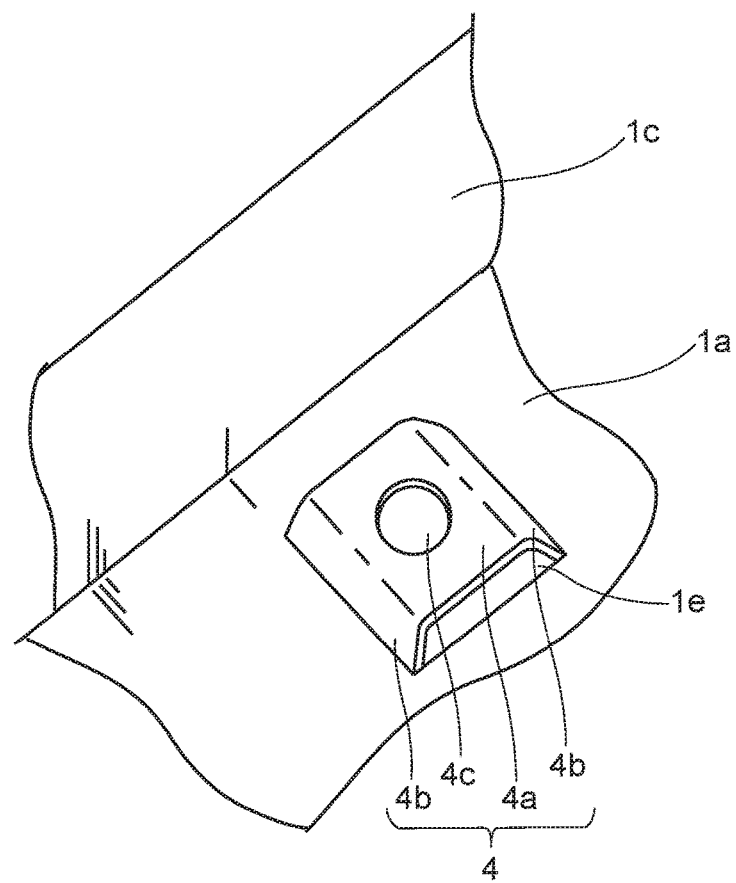
FIG. 14 is a perspective view illustrating the principal part, including a bottom convex-part, of the bottom case.
Figure 15:
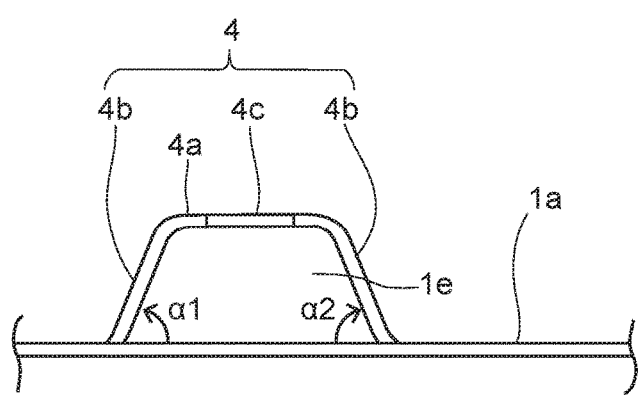
FIG. 15 is a right-side elevation view illustrating the principal part, including the bottom convex-part, of the bottom case.
Figure 16:
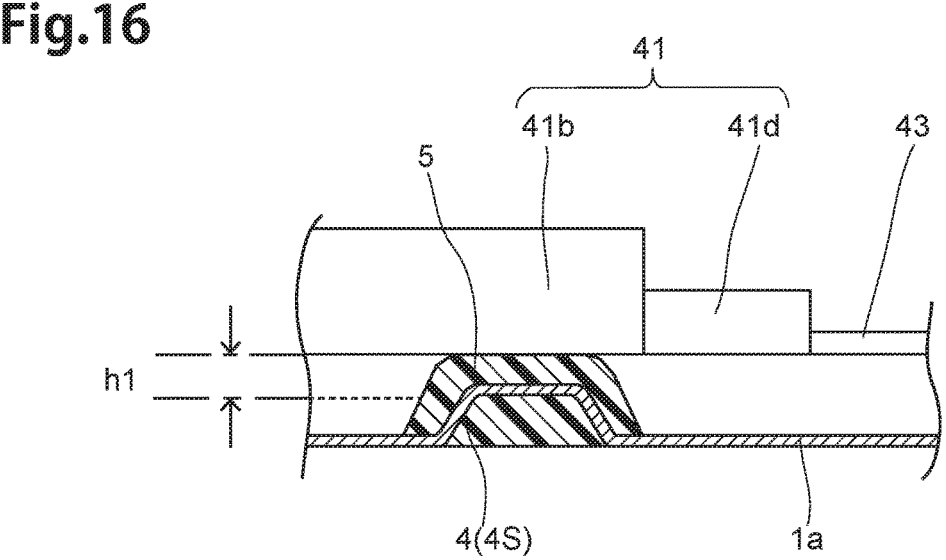
FIG. 16 is a sectional view illustrating the principal parts of the bottom case and the fiber unit, with parts of them omitted, similar with FIG. 6.

To begin with, the structure of an optical module package 100 according to the embodiment of the present invention will be explained with reference to FIG. 1 to FIG. 16. Here, FIG. 1 is an exploded perspective view illustrating the optical module package 100 according to the embodiment of the present invention, FIG. 2 is a perspective view illustrating the optical module package 100. FIG. 3 is a plan view illustrating a bottom case 1, FIG. 4 is a right-side elevation view illustrating the bottom case 1. FIG. 5 is a plan view illustrating the bottom case 1 in a state which elastic support part 5, side elastic support parts 6, 7 are removed. FIG. 6 is a sectional view taken along the line 6-6 in FIG. 3. FIG. 7 is a right-side elevation view illustrating the bottom case 1 which a part of a bottom wall part 1b is omitted, in a state which the elastic support part 5, side elastic support parts 6, 7 are removed. FIG. 8 is a bottom plan view illustrating a cover case 21. FIG. 9 is a plan view illustrating the cover case 21. FIG. 10 is a bottom plan view illustrating the cover case 21 in a state which elastic cover part 25, side elastic cover parts 26, 27 are removed. FIG. 11 is a right-side elevation view illustrating the cover case 21 which a bottom wall part 21b is omitted, in a state which the elastic cover part 25, side elastic cover parts 26, 27 are removed. FIG. 12 is a front view illustrating the bottom case 1. FIG. 13 is a front view illustrating the cover case 21. FIG. 14 is a perspective view illustrating the principal part, including a bottom convex-part 4, of the bottom case 1. FIG. 15 is a right-side elevation view illustrating the principal part, including the bottom convex-part 4, of the bottom case 1. FIG. 16 is a sectional view illustrating the principal parts of the bottom case 1 and the fiber unit 40, with parts of them omitted, similar with FIG. 6.

The optical module package 100 comprises the housing 11 and the fiber unit 40. The housing 11 comprises the bottom case 1 being the first case and the cover case 21 being the second case. The fiber unit 40 is accommodated inside the housing 11. On that occasion, though the later-described optical waveguide device 41 of the fiber unit 40 is supported by the later-described elastic support part 5 and elastic cover part 25, an optical fiber member 42 and a tape-shaped optical fiber member 43 are not supported by the elastic support part 5 and elastic cover part 25.

In the optical module package 100, as elastic member which supports the optical waveguide device 41, only the elastic support part 5 and elastic cover part 25 are provided. Therefore, the volume of elastic member which supports the optical waveguide device 41 is reduced than the case which the elastic member is arranged in the whole in the length direction of the bottom case 1 and the cover case 21. Then, the volume of elastic member, expanding or shrinking caused by the temperature-humidity cycle, become small. Accordingly, not only the vibration and shock, which reaches the fiber unit 40 are decreased but also increase of the transformation, breakage and insertion loss of the fiber unit 40 is suppressed.

The bottom case 1 is a U-figure like body which is formed of metal or plastic and formed in an almost U-figure shape. The bottom case 1 has, as illustrated in FIG. 1 in detail, a case bottom-part 1*a* and two bottom wall parts 1*b*, 1*c* opposing each other.

The case bottom-part 1*a* is formed along with the length direction of the fiber unit 40, and the bottom wall parts 1*b*, 1*c* are formed on the both sides of the width direction. Three locking concave parts 2, 3 are respectively formed on the bottom wall parts 1*b*, 1*c*. Further, lower wall parts 1*d*, 1*d* are arranged respectively on both sides of the bottom wall parts 1*b*, 1*c* along with the length direction. The lower wall parts 1*d*, 1*d* are formed lower than the intermediate parts of them. The side elastic support parts 6, 7 are arranged between the lower wall parts 1*d*, 1*d* of the bottom wall parts 1*b* and the lower wall parts 1*d*, 1*d* of the bottom wall parts 1*c*.

The bottom case 1 has a width (short side width) in a direction along a short side inside the case bottom-part 1*a* (the direction along the short side is also referred to as a "short side direction") set to L. Further, the bottom case 1 has a length enough to accommodate a later-described optical fiber member 42 and so on of the fiber unit 40 with a predetermined length.

As illustrated in FIG. 5, FIG. 6, the three bottom convex-parts 4 (4A, 4S, 4B) are formed on the case bottom-part 1*a*. The three bottom convex-parts 4 are placed on the approximately straight line along with the length direction of the bottom case 1, and they are arranged at the scattered three positions of both sides along with the length direction and the approximate center of the length direction of the bottom case 1. The bottom convex-parts 4A, 4B are arranged at both sides and the bottom convex-part 4S is arranged at the approximate center.

The respective bottom convex-part 4 is formed by partial projection and so on of the case bottom-part 1*a* from outside to inside (see in detail FIG. 14, FIG. 15). The respective bottom convex-part 4 has a top-end-part 4*a* and slanting-side-parts 4*b*, 4*b* arranged both sides of the length direction.

The top-end-part 4*a* projects most inside the bottom case 1, and it is formed approximately rectangular flat shape. The slanting-side-parts 4*b*, 4*b* are parts which connects the top-end-part 4*a* and the case bottom-part 1*a*, and they are formed with slanting condition which the interior angle $\alpha 1$, $\alpha 2$ between the slanting-side-parts 4*b*, 4*b* and the case bottom-part 1*a* are acute angles, as illustrated in FIG. 15. Further, hole parts 4*c* having approximately circle shape are formed at about center of the respective bottom convex-part 4. Therefore, the respective bottom convex-part 4 has a hole-opening structure. Further, the parts, except for the slanting-side-parts 4*b*, 4*b* of the parts between the top-end-part 4*a* and the case bottom-part 1*a*, are opened as an opening 1*e*. The opening 1*e* is formed in the position adjacent to the bottom convex-part 4.

The elastic support part 5, the side elastic support parts 6, 7 are formed using soft members with rubber elasticity. For example, the elastic support part 5, side elastic support parts 6, 7 can be formed using rubbers such as chloroprene rubber, butyl rubber, chlorosulfonation polyethylene rubber, ethylene propylene rubber, acrylonitrile rubber, polysulfide rubber, natural rubber used as industrial rubber packing materials, and other silicon rubber, fluorine-containing rubber, polyacrylic rubber, polyurethane rubber and the like.

The elastic support part 5, side elastic support parts 6, 7 cover the respective whole surfaces of the bottom convex-parts 4S, 4A, 4B. The elastic support part 5, side elastic support parts 6, 7 are arranged at the three positions of both sides along with the length direction and the approximate center of the length direction of the case bottom-part 1*a*. The elastic support part 5, side elastic support parts 6, 7 contact the surfaces of the bottom convex-parts 4S, 4A, 4B without gap. The elastic support part 5, side elastic support parts 6, 7 have a unified structure which they are respectively unified with the bottom convex-parts 4S, 4A, 4B. The elastic support part 5, side elastic support parts 6, 7 are formed separately without mutual contacts.

The elastic support part 5, side elastic support parts 6, 7 are manufactured by injection molding via the hole parts 4*c*, for example. In this case, not-illustrated predetermined molding boxes are arranged on the case bottom-part 1*a* so as to surround the respective bottom convex-parts 4S, 4A, 4B. Subsequently, melted material is injected from the hole parts 4*c* (and/or opening 1*e*). After that, when the bottom case 1 is cooled down to be stiffened, the elastic support part 5, side elastic support parts 6, 7, being in contact with the bottom convex-parts 4S, 4A, 4B and unified with the bottom convex-parts 4S, 4A, 4B, are manufactured.

The elastic support part 5 has an elastic top-end-part 5*a* corresponding to the top-end-part 4*a* and elastic slanting-side-parts 5*b*, 5*b* of both sides corresponding to the slanting-side-parts 4*b*, 4*b*. The volume of the elastic support part 5, corresponding to the thickness of the bottom convex-parts 4S, is reduced because of covering the bottom convex-parts 4S. Further, the elastic top-end-part 5*a* is arranged between the top-end-part 4*a* and the optical waveguide device 41.

The side elastic support part 6 has an optical fiber holding surface 6*a* having rectangular flat shape in a plan view on the cover case 21 side, as illustrated in FIG. 3, a fiber concave part 6*b* is formed at the center of width direction. The fiber concave part 6*b* is formed with the shape corresponding to the later-described optical fiber member 42 along with the length direction of the bottom case 1. The part of the side elastic support part 6 is arranged outside of the bottom case 1.

The side elastic support part 7 has an optical fiber holding surface 7*a* having rectangular flat shape in a plan view on the cover case 21 side, a fiber concave part 7*b* is formed at the center of width direction. The fiber concave part 7*b* is formed with the shape corresponding to the later-described optical fiber member 43 along with the length direction of the bottom case 1. The part of the side elastic support part 7 is arranged outside of the bottom case 1.

The cover case 21 is a U-figure like body which is formed of metal or plastic and formed in an almost U-figure shape, similar with the bottom case 1. The cover case 21 has the length common with the bottom case 1.

The cover case 21 has, as illustrated in FIG. 1, a case peak-part 21*a* and two cover wall parts 21*b*, 21*c* opposing each other. The case peak-part 21*a* is formed along with the length direction of the fiber unit 40, and the cover wall parts 21*b*, 21*c* are formed on the both sides of the width direction. Three locking convex parts 22, 23 are respectively formed on the cover wall parts 21*b*, 21*c*. The locking convex parts 22, 23 are arranged with the position corresponding to the locking concave parts 2, 3. The locking convex parts 22, 23 have respectively convex parts, engage with the locking concave parts 2, 3 from outside.

The three peak convex-parts 24 (24A, 24S, 24B) are formed on the case peak-part 21a. The three peak convex-parts 24 are placed on the approximately straight line along with the length direction of the cover case 21, and they are arranged at the three scattered positions of both sides along with the length direction and the approximate center of the length direction of the cover case 21. The peak convex-parts 24A, 24B are arranged at both sides and the peak convex-parts 24S is arranged at the approximate center (see in detail FIG. 10). The respective peak convex-part 24 has a structure common with the bottom convex-part 4.

The respective peak convex-parts 24 has a cover top-end-part 24a and cover slanting-side-parts 24b, 24b. The cover top-end-parts 24a are formed approximately rectangular flat shape, similar with the top-end-part 4a. The cover slanting-side-parts 24b, 24b are parts which connects the cover top-end-part 24a and the case peak-part 21a similar with the slanting-side-parts 4b, 4b, and they are formed with slanting condition which the inner angle between the cover slanting-side-parts 24b, 24b and the case peak-part 21a are acute angles, as not illustrated. Because hole parts 24c having approximately circle shape are formed at about center of the cover top-end-part 24a, each peak convex-part 24 has the hole-opening structure. Further, the parts, except for the cover slanting-side-parts 24b, 24b of the parts between the case peak-part 21a and the cover top-end-part 24a, are opened as an opening 21e (see FIG. 11).

The elastic cover part 25, side elastic cover parts 26, 27 are formed using soft members with rubber elasticity, similar with the elastic support part 5, side elastic support parts 6, 7. Further, the elastic cover part 25, side elastic cover parts 26, 27 are manufactured with injection molding via the hole parts 24c, for example.

The elastic cover part 25, side elastic cover parts 26, 27 cover the respective whole surfaces of the peak convex-parts 24S, 24A, 24B. The elastic cover part 25, side elastic cover parts 26, 27 are arranged at the three positions of both sides along with the length direction and the approximate center of the length direction of the case peak-part 21a. The elastic cover part 25, side elastic cover parts 26, 27 contact the surfaces of the peak convex-parts 24S, 24A, 24B. The elastic cover part 25, side elastic cover parts 26, 27 have the unified structure which they are respectively unified with the peak convex-parts 24S, 24A, 24B. The elastic cover part 25, side elastic cover parts 26, 27 are formed separately without mutual contacts.

The elastic cover part 25 has an elastic cover top-end-part 25a corresponding to the cover top-end-part 24a and elastic cover slanting-side-parts 25b, 25b of both sides corresponding to the cover slanting-side-parts 24b, 24b. The elastic cover top-end-part 25a of the elastic cover part 25 is in contact with the optical waveguide device 41.

The side elastic cover part 26 has an optical fiber holding surface 26a having rectangular flat shape on the bottom case 1 side, as illustrated in FIG. 8, a fiber concave part 26b, similar with the fiber concave part 6b, is formed at the center of width direction. The part of the side elastic cover part 26 is arranged outside the cover case 21.

The side elastic cover part 27 has an optical fiber holding surface 27a having rectangular flat shape on the cover case 21 side, a fiber concave part 27b, similar with the fiber concave part 7b, is formed at the center of width direction. The part of the side elastic cover part 27 is arranged outside the cover case 21.

The fiber unit 40 is constituted such that the optical fiber member 42 and the tape-shaped optical fiber member 43 are connected with the optical waveguide device 41, and they are united together.

Figure 17:
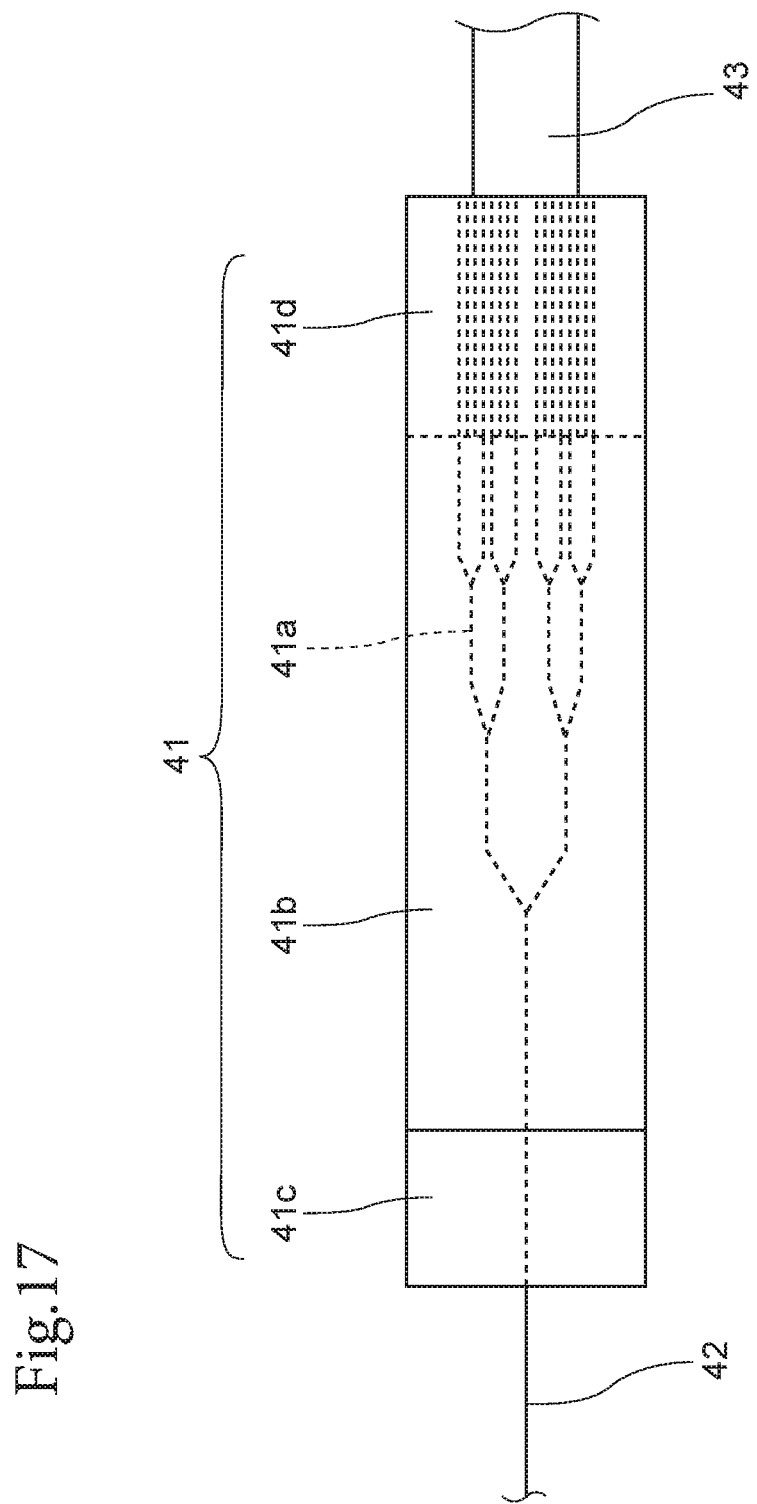
FIG. 17 is a plan view illustrating an outline constitution of the fiber unit.

The optical waveguide device 41 has, as illustrated in FIG. 17, an optical waveguide substrate 41b formed with an optical waveguide 41a and fiber connectors 41c, 41d, and it has a structure which they are united together.

The optical waveguide 41a is formed such that multiple waveguide cores are branched off from a single waveguide core. The optical waveguide 41a enables light incident from the single waveguide core to be equivalently branched off to the multiple waveguide cores.

The fiber connector 41c is a connector to which the single-core optical fiber member 42 is connected, and is fixed to one end part of the optical waveguide substrate 41b using a not-illustrated adhesive. The fiber connector 41d is a connector to which the multi-core tape-shaped optical fiber member 43 is connected, and is fixed to the other end part of the optical waveguide substrate 41b using a not-illustrated adhesive.

The optical fiber member 42 has a structure in which a single-core optical fiber is covered with a coating material. The tape-shaped optical fiber member 43 has a structure in which a plurality of (for example, eight) optical fibers arranged in parallel to each other are covered around with a coating material into a tape shape.

Then, the fiber unit 40 is accommodated in the bottom case 1 with being supported by the elastic support part 5, side elastic support parts 6, 7. In this case, the optical fiber member 42, the tape-shaped optical fiber member 43 are respectively accommodated in the fiber concave part 6b, fiber concave part 7b. Further, as illustrated in FIG. 16, the optical waveguide substrate 41b of the optical waveguide device 41 is supported by elastic support part 5 though, the fiber connectors 41c, 41d are not supported by the elastic support part 5. Further, the elastic cover part 25 is in contact with the optical waveguide substrate 41b though, the fiber connectors 41c, 41d are not in contact with the elastic cover part 25.

As described above, the bottom case 1, which the fiber unit 40 is accommodated, is prepared, and the bottom case 1 is covered with the cover case 21 from upper side, thereby the optical module package 100 is constituted.

In this case, for example at first, the optical waveguide substrate 41b is put on the elastic support part 5. Further, the optical fiber member 42 and the tape-shaped optical fiber member 43 are respectively accommodated in the fiber concave parts 6b, 7b.

Next, the outside of the bottom case 1 is covered with the cover case 21 and the locking convex parts 22, 23 are respectively engaged with the concave parts 2, 3. Then, as illustrated in FIG. 2, the cover wall parts 21b, 21c of the cover case 21 are in closely contact with the bottom wall parts 1b, 1c of the bottom case 1 from outside, thereby the bottom case 1 and the cover case 21 are united. In this way, the optical module package 100 is completed.

At this time, the elastic cover part 25 is in contact with the surface, not being in contact with the elastic support part 5, of the optical waveguide substrate 41b. Further, the optical fiber holding surface 6a is in contact with the optical fiber holding surface 26a to form the gap having cylindrical shape by the fiber concave parts 6b, 26b, and the optical fiber holding surface 7a is in contact with the optical fiber holding surface 27a to form the gap having cylindrical shape by the fiber concave parts 7b, 27b. Then, the optical waveguide substrate 41b is held by being sandwiched between the elastic support part 5 and the elastic cover part 25. Further, the optical fiber member 42 is held in the cylindrical gap by the fiber concave parts 6*b*, 26*b*, the tape-shaped optical fiber member 43 is held in the cylindrical gap by the fiber concave parts 7*b*, 27*b*.

(Operation and Effect of Optical Module Package 100)

As in the foregoing, in the optical module package 100, the fiber unit 40 is accommodated in the bottom case 1 under the condition that the fiber unit 40 is held by the elastic support part 5, side elastic support parts 6, 7 and the elastic cover part 25, side elastic cover parts 26, 27. Then, the elastic support part 5, side elastic support parts 6, 7 and the elastic cover part 25, side elastic cover parts 26, 27 absorb the vibration and shock which was brought to the optical module package 100. Therefore, the vibration and shock, which was brought to the fiber unit 40, are decreased by the elastic support part 5, side elastic support parts 6, 7 and the elastic cover part 25, side elastic cover parts 26, 27.

Further, in the optical module package 100, the optical waveguide device 41 is supported by the elastic support part 5 and the elastic cover part 25, and the optical fiber member 42 and the tape-shaped optical fiber member 43 are arranged at the position distant from the elastic support part 5 and the elastic cover part 25. Therefore, elastic member, which supports the optical waveguide device 41, is only the elastic support part 5 and the elastic cover part 25. Then, the volume of elastic member which supports the optical waveguide device 41 is reduced than the case which the elastic member is arranged in the whole in the length direction of the bottom case 1 and the cover case 21.

Therefore, volume of elastic support part 5, elastic cover part 25 expanding or shrinking caused by the temperature-humidity cycle, are smaller than the elastic member arranged in the whole in the length direction. Therefore, even if the elastic support part 5 expands or shrinks caused by the temperature-humidity cycle, the load by the pressure and so on, which is brought to the fiber unit 40, is small. Accordingly, the optical module package 100, because the load caused by the temperature-humidity cycle is decreased, the increase of the transformation, breakage and insertion loss of the fiber unit 40 is suppressed.

Moreover, the elastic support part 5 exhibits a volume reduction effect by covering the bottom convex-part 4. Namely, because the elastic support part 5 has the elastic slanting-side-parts 5*b*, 5*b* corresponding to the slanting-side-parts 4*b*, 4*b*, the volume of the elastic support part 5 is reduced than the lump-shaped elastic member. Accordingly, the increase of the transformation, breakage and insertion loss of the fiber unit 40 is more suppressed.

Further, when the elastic slanting-side-parts 5*b*, 5*b* are formed, an interval, between the side surface of the elastic support part 5 and the optical waveguide device 41, is wider than the case which the side surface is formed vertically. Then, even if the elastic support part 5 expands, the elastic support part 5 is hardly contact with the optical waveguide device 41, thereby the load is decreased.

Though the elastic top-end-part 5*a* is arranged between the top-end-part 4*a* and the optical waveguide device 41, the elastic top-end-part 5*a* is a part of the elastic support part 5. Whereupon, only the top-end-part 5*a* brings direct load to the optical waveguide device 41, another part dose not brings direct load to the optical waveguide device 41. Therefore, the load which reaches the fiber unit 40 is decreased.

Furthermore, the elastic support part 5, side elastic support parts 6, 7 are arranged at the scattered positions without mutual contact. Then, the volume of the elastic member constituting the elastic support part 5, side elastic support parts 6, 7 are reduced than the case which the elastic member is formed to cover the whole surface of the case bottom-part 1*a*. Therefore, in the optical module package 100, because the load caused by the temperature-humidity cycle is more decreased, the increase of the transformation, breakage and insertion loss of the fiber unit 40 is more surely suppressed.

Further, the elastic support part 5, side elastic support parts 6, 7 and the elastic cover part 25, side elastic cover parts 26, 27 are arranged at the three scattered positions. The optical fiber member 42, tape-shaped optical fiber member 43 are held by the side elastic support parts 6, 7, the side elastic cover parts 26, 27, the optical waveguide device 41 is held by the elastic support part 5, the elastic cover part 25. The center of gravity of the fiber unit 40 is located in the optical waveguide device 41, the elastic support part 5 and the elastic cover part 25 hold the optical waveguide device 41. The optical fiber member 42, tape-shaped optical fiber member 43, which are more fragile than the optical waveguide device 41, are held respectively by the side elastic support part 6 and the side elastic cover part 26, the side elastic support part 7 and the side elastic cover part 27 so as to be sandwiched. The optical fiber member 42, tape-shaped optical fiber member 43 are held so as not be broken.

Further, because the optical waveguide device 41, the optical fiber member 42 and the tape-shaped optical fiber member 43 are held from both sides so as to be sandwiched, the optical fiber member 42 and the tape-shaped optical fiber member 43 are held stably.

On the other hand, because the bottom convex-parts 4 have the hole-opening structure, melted material is able to be injected from the hole parts 4*c* (and/or the opening 1*e*). Thereby, the elastic support part 5, side elastic support parts 6, 7 are easily manufactured. Moreover, the elastic support part 5, side elastic support parts 6, 7 are closely in contact with the bottom convex-parts 4S, 4A, 4B to be unified and become a structure which the elastic support part 5, side elastic support parts 6, 7 hardly peel off.

Further, because the bottom convex-part 4 has the slanting-side-parts 4*b*, melted material is easy to spread to the periphery through the slanting-side-parts 4*b*, after injection from the hole parts 4*c*. Therefore, the elastic support part 5, side elastic support parts 6, 7, being in contact with the bottom convex-parts 4, are surely manufactured. Accordingly, defective molding about the elastic support part 5, side elastic support parts 6, 7 hardly occurs.

In this case, size of parts, which the bottom convex-parts 4 are in contact with the elastic support part 5, side elastic support parts 6, 7, is enlarged than the case which the side surfaces are not the slanting-side-parts (for example, the side surfaces cross at right angle with the case bottom-part 1*a*). Accordingly, contact condition of the bottom convex-parts 4 and the elastic support part 5, side elastic support parts 6, 7 becomes more strongly.

Further, because the openings 1*e* are formed, melted material is also injected from the openings 1*e*. Accordingly, the elastic support part 5, side elastic support parts 6, 7, being in contact with the bottom convex-parts 4, are surely manufactured.

Figure 23:
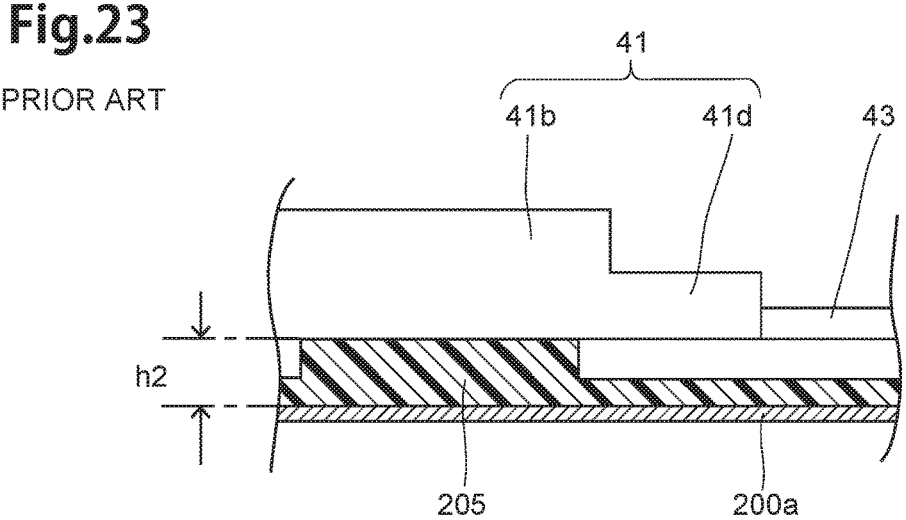
FIG. 23 is a sectional view illustrating the principal part of the conventional bottom case and the fiber unit.

On the other hand, as illustrated in FIG. 23, a member corresponding to the bottom convex-parts 4 are not formed on the case bottom part 200*a*, in the conventional optical module package. Therefore, the elastic member 205, having a certain thickness (for example h2), need to be formed so that the elastic member 205 has a structure capable of supporting the optical waveguide device 41.

On the contrary to the above, as illustrated in FIG. 16, in case of the optical module package 100, because the bottom convex-parts 4 are formed, the thickness of elastic member (for example, h1), which supports the fiber unit 40, is able to be reduced (h1<h2). Therefore, the fiber unit 40 is able to be supported stably than the conventional technology.

Because the peak convex-parts 24 and the elastic cover part 25, side elastic cover parts 26, 27 are formed on the cover case 21 in addition to the bottom case 1, the fiber unit 40 is able to be held so as to be sandwiched between them. Therefore, the holding power of the optical module package 100 is raised, the fiber unit 40 is held more firmly.

The bottom case is the U-figure like body, and the fiber unit 40 is able to be directly inserted and extracted to/from an elongated space sandwiched between the bottom wall parts 1b and 1c. Therefore, the bottom case 1 allows the fiber unit 40 to be accommodated therein while the optical fiber member 42 and the tape-shaped optical fiber member 43 are kept extending along the axial core direction without being bent. Consequently, it is unnecessary to insert the optical fiber member 42 and so on into a tubular member when accommodating the fiber unit 40 in the bottom case 1 in the optical module package 100, thus making it possible to reduce the effort and time required to manufacture the optical module package 100.

The parts of the side elastic support parts 6,7, side elastic cover parts 26, 27 are arranged outside the bottom case 1, the cover case 21. Therefore, even if the optical fiber member 42 and the tape-shaped optical fiber member 43 bent, the condition, which they are in contact with the bottom case 1 and the cover case 21, is able to be avoided.

(Modified Example)

Figure 18:
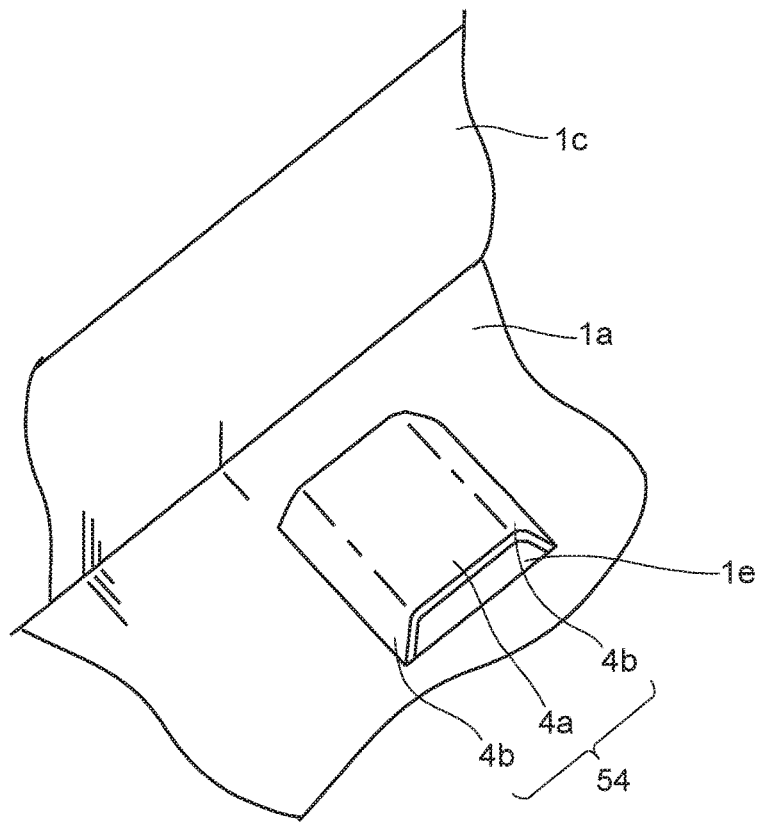
FIG. 18 is a perspective view illustrating the principal part, including the bottom convex-part according to a modified example, of the bottom case.

The optical module package according to a modified example will now be explained with reference to FIG. 18 to FIG. 22. In the optical module package 100 according to a modified example, as illustrated in FIG. 18, bottom convex-parts 54 are formed on the case bottom-part 1a instead of the bottom convex-parts 4. The bottom convex-parts 54 are different from the bottom convex-parts 4 in that the hole parts 4c are not formed in the bottom convex-parts 54. Even if the bottom convex-parts 54 are formed, the openings 1e are formed. Therefore, because melted material is injected from the openings 1e, the elastic support part 5, side elastic support parts 6, 7, which are closely in contact with the bottom convex-parts 54 and are united with the case bottom-part 1a, are manufactured, similar with the case of the bottom convex-parts 4.

Figure 19:
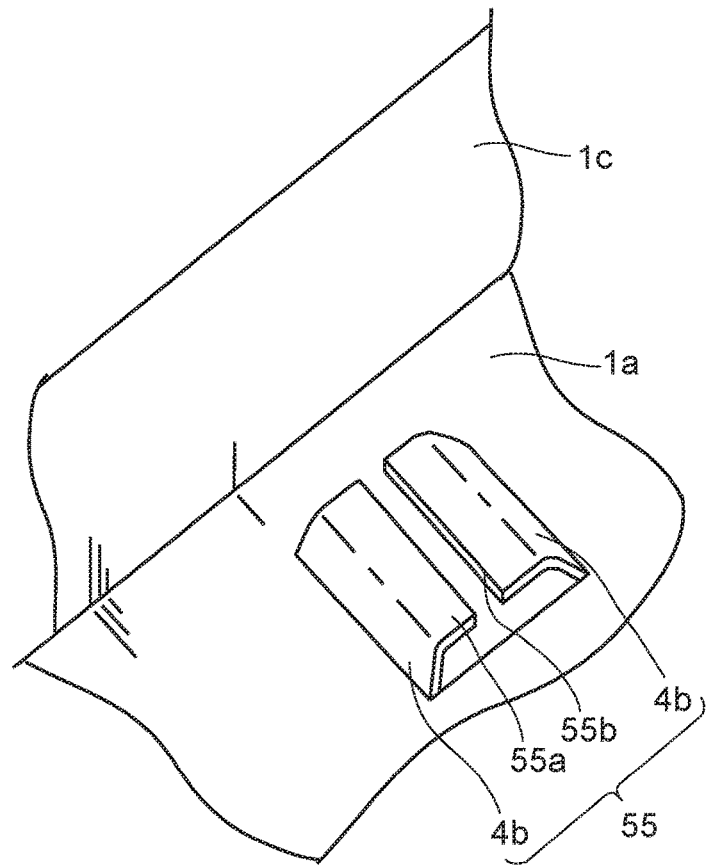
FIG. 19 is a perspective view illustrating the principal part, including the bottom convex-part according to another modified example, of the bottom case.

Further, as illustrated in FIG. 19, it is possible that bottom convex-parts 55 are formed on the case bottom-part 1a instead of the bottom convex-parts 4. The bottom convex-parts 55 are different from the bottom convex-parts 4 in that top-end-parts 55a and linear lack parts 55b are formed. Even if the bottom convex-parts 55 are formed, the linear lack parts 55b and openings 1e are formed. Therefore, because melted material is injected from the linear lack parts 55b and the openings 1e, the elastic support part 5, side elastic support parts 6, 7, which are closely in contact with the bottom convex-parts 54 and are united with the case bottom-part 1a, are manufactured.

Figure 20:
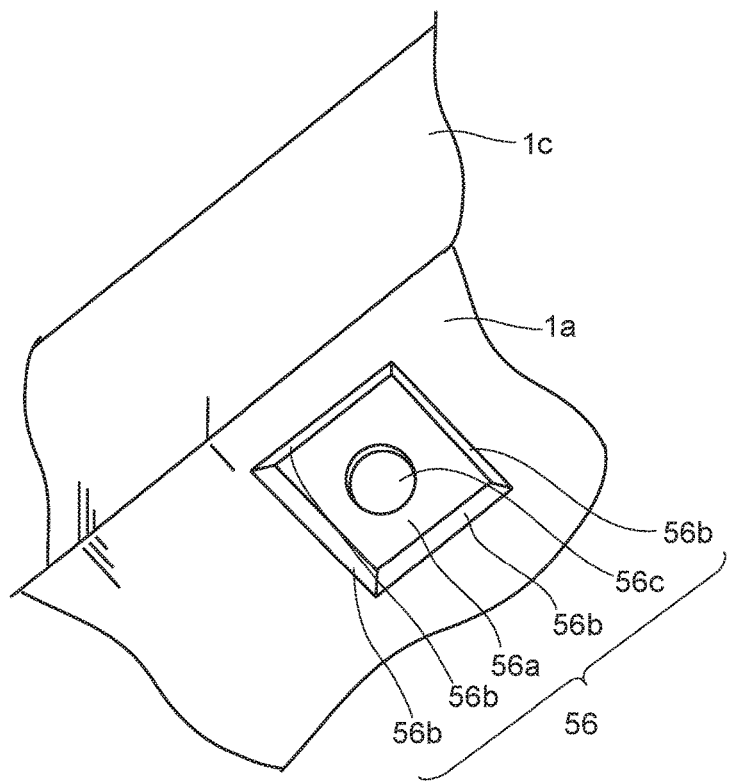
FIG. 20 is a perspective view illustrating the principal part, including the bottom convex-part according to still another modified example, of the bottom case.
Figure 21:
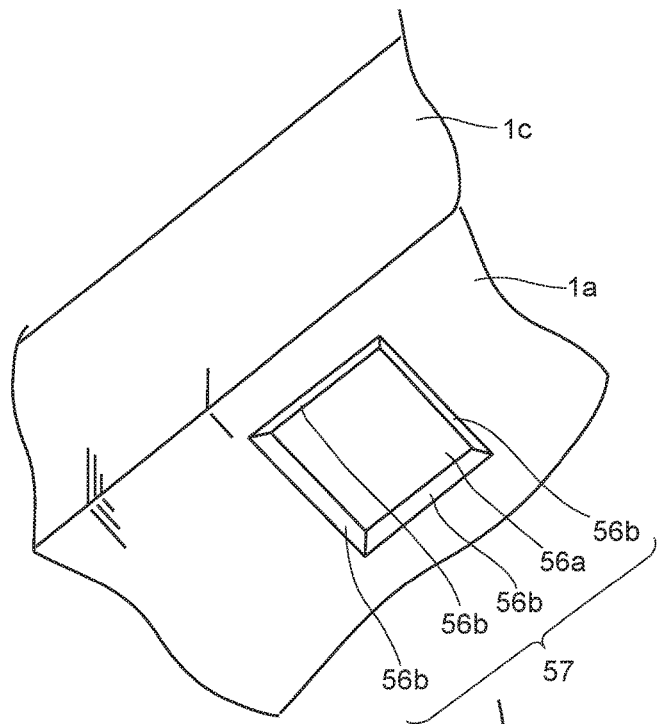
FIG. 21(a) is a perspective view illustrating the principal part of the bottom case having a bottom convex-part without a hall part.
FIG. 21(b) is a perspective view illustrating the principal part of the bottom case having the bottom convex-part of (a)
Figure 21:
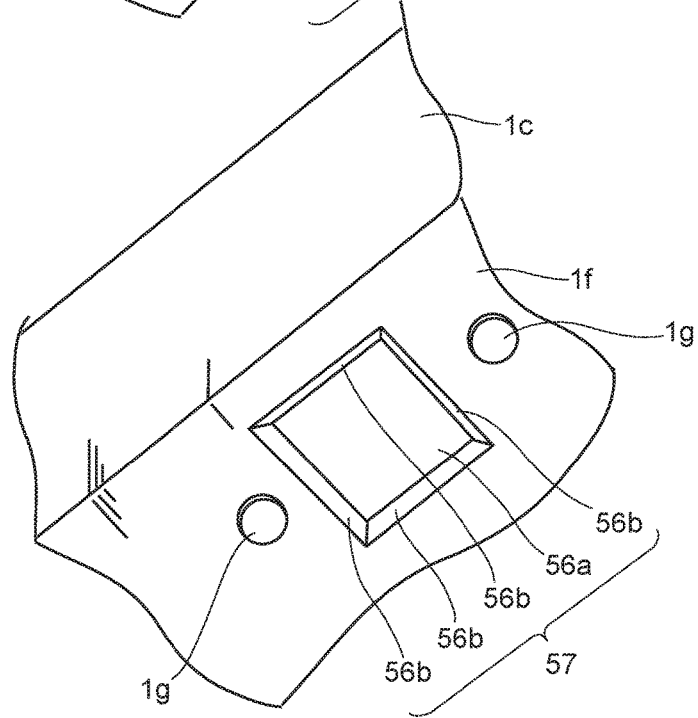

Further, as illustrated in FIG. 20, it is possible that bottom convex-parts 56 are formed on the case bottom-part 1a instead of the bottom convex-parts 4. The bottom convex-parts 56 are different from the bottom convex-parts 4 in that they have top-end-parts 56a and slanting-side-parts 56b, and the openings 1e are not formed. The top-end-part 56a is a flat surface having approximately rectangular shape similar with the top-end-part 4a, the slanting-side-parts 56b are arranged at four directions. Therefore, the openings 1e are not formed. However, hole parts 56c, having circular shape, are formed in the top-end-parts 56a. Even if the bottom convex-parts 56 are formed, melted material is injected from the hole parts 56c. Therefore, the elastic support part 5, side elastic support parts 6, 7, which are closely in contact with the bottom convex-parts 56 and are united with the case bottom-part 1a, are manufactured.

On the other hand, as illustrated in FIG. 21(a), it is possible that bottom convex-parts 57 are formed on the case bottom-part 1a instead of the bottom convex-parts 4. The bottom convex-parts 57 are different from the bottom convex-parts 56 in that the hole parts 56c are not formed. In this case, the elastic support part 5, side elastic support parts 6, 7 are able to be formed with another method different from the injection molding. For example, the elastic support part 5, side elastic support parts 6, 7 are formed in advance, and they are adhered on the bottom convex-parts 4 with adhesive, thereby elastic support part 5, side elastic support parts 6, 7, which are united with the case bottom-part 1a, are manufactured.

At this point, it is possible that the bottom case 1 has a case bottom-part 1f instead of the case bottom-part 1a. The case bottom-part 1f is different from the case bottom-parts 1a in that hole parts 1g, 1g are formed in the case bottom-part 1f. Because the hole parts 1g, 1g are formed, melted material is injected from the hole parts 1g, 1g, thereby the elastic support part 5, side elastic support parts 6, 7, which are in contact with the bottom convex-parts 57, are manufactured. The bottom case 1 of this case has a case hole-opening structure, because the hole parts 1g, 1g are formed on the case bottom-part 1f.

Figure 22:
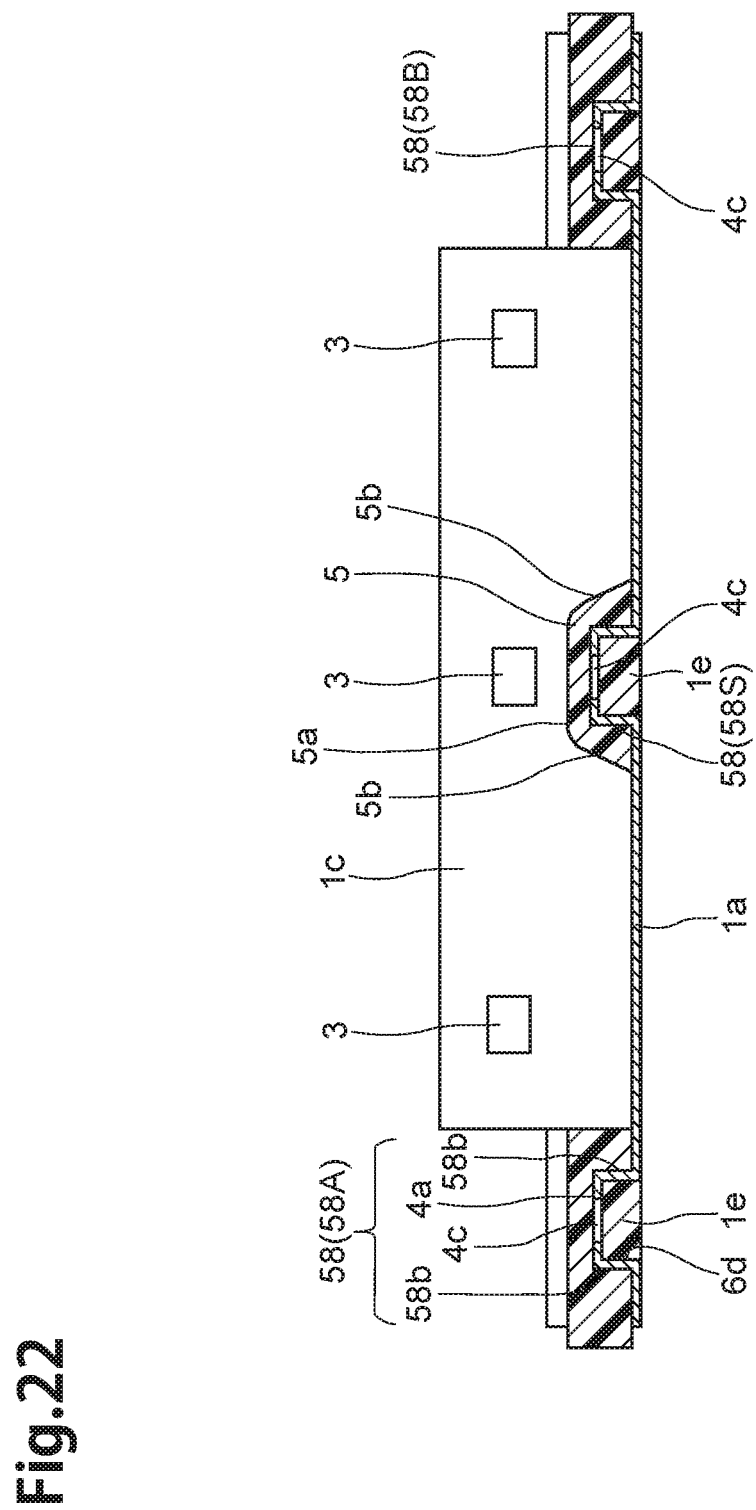
FIG. 22 is a sectional view, similar with FIG. 6, illustrating the bottom case having the bottom convex-part according to a modified example.

Further, as illustrated in FIG. 22, it is possible that bottom convex-parts 58 (58A, 58S, 58B) are formed on the case bottom-part 1a instead of the bottom convex-parts 4 (4A, 4S, 4B). The bottom convex-parts 58 are different from the bottom convex-parts 4 in that they have the top-end-parts 4a and vertical-side-parts 58b, 58b. The vertical-side-parts 58b, 58b are different from the slanting-side-parts 4b, 4b in that they are formed with condition which the interior angle between the vertical-side-parts 58b, 58b and the case bottom-part 1a are approximate right-angles. Even if the bottom convex-parts 58 having the vertical-side-parts 58b, 58b are formed, the elastic support part 5 has the elastic slanting-side-parts 5b, 5b. The bottom convex-parts 58 has the top-end-part 4a which the hole parts 4c are formed, similar with the bottom convex-parts 4, and the openings 1e are formed. Therefore, the elastic support part 5, illustrated in FIG. 22, is also able to be manufactured with injection molding via the hole parts 4c (and/or opening 1e).

On the above embodiments, the bottom convex-parts 4, which the hole parts 4c are formed in the top-end-parts 4a, are explained exemplarily as the bottom convex-parts having the hole-opening structure. As not illustrated, it is possible that the hole parts 4c are able to be formed in the slanting-side-parts 4b, 4b instead of the top-end-parts 4a.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. An optical module package in which an optical waveguide device formed with an optical waveguide and an optical fiber are accommodated in a housing, the housing comprising:
   a first case which a fiber unit is accommodated, the fiber unit is constituted by connecting the optical fiber with the optical waveguide device; and
   a second case which covers the first case;
   wherein the first case has a case bottom-part formed along the length direction of the fiber unit, a bottom convex-part being formed on the case bottom-part so as to project toward inside direction of the first case, and an elastic support part made of an elastic member and covering the bottom convex-part, the elastic support part being unified with the bottom convex-part by filling material into an area underneath the bottom convex-part,
   wherein the optical waveguide device is supported by the elastic support part and the optical fiber is arranged at a position from the elastic support part.

2. The optical module package according to claim 1,
   wherein the bottom convex-part has a top-end-part projecting most inside the first case, a part of the elastic support part is arranged between the top-end-part and the optical waveguide device.

3. An optical module package in which an optical waveguide device formed with an optical waveguide and an optical fiber are accommodated in a housing, the housing comprising:
   a first case which a fiber unit is accommodated, the fiber unit is constituted by connecting the optical fiber with the optical waveguide device; and
   a second case which covers the first case;
   wherein the first case has a case bottom-part formed along the length direction of the fiber unit, a bottom convex-part being formed on the case bottom-part so as to project toward inside direction of the first case, and an elastic support part made of an elastic member and covering the bottom convex-part,
   wherein the optical waveguide device is supported by the elastic support part and the optical fiber is arranged at a distant position from the elastic support part,
   wherein two side bottom convex-parts together with the bottom convex-part are arranged in three locations including both sides along with the length direction of the first case and about the center of the first case, and the elastic support part covers the bottom convex-part arranged in about the center,
   wherein the first case further comprises side elastic support parts, made of elastic member, which cover the two side bottom convex-parts arranged in the both sides of the first case.

4. The optical module package according to claim 2,
   wherein the bottom convex-part has a slanting-side-part which connects the top-end-part and the case bottom-part,
   wherein the slanting-side-part is formed so that an interior angle between the slanting-side-part and the case bottom-part is an acute angle.

5. An optical module package in which an optical waveguide device formed with an optical waveguide and an optical fiber are accommodated in a housing, the housing comprising:
   a first case which a fiber unit is accommodated, the fiber unit is constituted by connecting the optical fiber with the optical waveguide device; and
   a second case which covers the first case;
   wherein the first case has a case bottom-part formed along the length direction of the fiber unit, a bottom convex-part being formed on the case bottom-part so as to project toward inside direction of the first case, and an elastic support part made of an elastic member and covering the bottom convex-part,
   wherein the optical waveguide device is supported by the elastic support part and the optical fiber is arranged at a distant position from the elastic support part,
   wherein the bottom convex-part has a top-end-part projecting most inside the first case, a part of the elastic support part is arranged between the top-end-part and the optical waveguide device,
   wherein the bottom convex-part has a slanting-side-part which connects the top-end-part and the case bottom-part,
   wherein the slanting-side-part is formed so that an interior angle between the slanting-side-part and the case bottom-part is an acute angle,
   wherein a hole part is formed at the top-end-part or the slanting-side-part of the bottom convex-part,
   wherein the elastic support part has an elastic slanting-side-part corresponding to the slanting-side-part, and the elastic support part is unified with the bottom convex-part by injection molding via the hole part.

6. An optical module package in which an optical waveguide device formed with an optical waveguide and an optical fiber are accommodated in a housing, the housing comprising:
   a first case which a fiber unit is accommodated, the fiber unit is constituted by connecting the optical fiber with the optical waveguide device; and
   a second case which covers the first case;
   wherein the first case has a case bottom-part formed along the length direction of the fiber unit, a bottom convex-part being formed on the case bottom-part so as to project toward inside direction of the first case, and an elastic support part made of an elastic member and covering the bottom convex-part,
   wherein the optical waveguide device is supported by the elastic support part and the optical fiber is arranged at a distant position from the elastic support part,
   wherein the first case has an opening, via which a part of the case bottom-part is opened, formed in a position adjacent to the bottom convex-part,
   wherein the elastic support part is unified with the bottom convex-part by injection molding via the opening.

7. The optical module package according to claim 3,
   wherein a hole part is formed at the case bottom-part of the first case,
   wherein the elastic support part and the side elastic support parts are unified with the bottom convex-part and the two side bottom convex-parts by injection molding via the hole parts.

8. The optical module package according to claim 1,
   wherein the second case has a case peak-part formed along the length direction of the fiber unit, a peak convex-part formed on the case peak-part so as to project toward inside direction of the second case and an elastic cover part made of elastic member and covering the peak convex-part,
   wherein the optical waveguide device is in contact with the elastic cover part and the optical fiber is arranged at another distant position from the elastic cover part.

9. An optical module package in which an optical waveguide device formed with an optical waveguide and an optical fiber are accommodated in a housing, the housing comprising:
- a first case which a fiber unit is accommodated, the fiber unit is constituted by connecting the optical fiber with the optical waveguide device; and
- a second case which covers the first case;
- wherein the first case has a case bottom-part formed along the length direction of the fiber unit, a bottom convex-part being formed on the case bottom-part so as to project toward inside direction of the first case, and an elastic support part made of an elastic member and covering the bottom convex-part,
- wherein the optical waveguide device is supported by the elastic support part and the optical fiber is arranged at a distant position from the elastic support part,
- wherein the second case has a case peak-part formed along the length direction of the fiber unit, a peak convex-part formed on the case peak-part so as to project toward inside direction of the second case and an elastic cover part made of elastic member and covering the peak convex-part,
- wherein the optical waveguide device is in contact with the elastic cover part and the optical fiber is arranged at another distant position from the elastic cover part,
- wherein the peak convex-part and two side peak convex-parts are arranged in three locations including both sides along with the length direction of the second case and about the center of the second case, and the elastic cover part covers the peak convex-part arranged in about the center,
- wherein the second case further comprises side elastic cover parts, made of elastic member, which cover the two side peak convex-parts arranged in the both sides.

10. The optical module package according to claim 9, wherein the side elastic cover parts have fiber concave parts formed with shape corresponding to the optical fiber.

11. An optical module package in which an optical waveguide device formed with an optical waveguide and an optical fiber are accommodated in a housing, the housing comprising:
- a first case which a fiber unit is accommodated, the fiber unit is constituted by connecting the optical fiber with the optical waveguide device; and
- a second case which covers the first case;
- wherein the first case has a case bottom-part formed along the length direction of the fiber unit, a bottom convex-part being formed on the case bottom-part so as to project toward inside direction of the first case, and an elastic support part made of an elastic member and covering the bottom convex-part,
- wherein the optical waveguide device is supported by the elastic support part and the optical fiber is arranged at a distant position from the elastic support part,
- wherein the second case has a case peak-part formed along the length direction of the fiber unit, a peak convex-part formed on the case peak-part so as to project toward inside direction of the second case and an elastic cover part made of elastic member and covering the peak convex-part,
- wherein the optical waveguide device is in contact with the elastic cover part and the optical fiber is arranged at another distant position from the elastic cover part,
- wherein the peak convex-part has a cover top-end-part projecting most inside the second case and a cover slanting-side-part connecting the cover top-end-part and the case peak-part,
- wherein the cover slanting-side-part is formed so that an interior angle between the cover slanting-side-part and the case peak-part is an acute angle.

12. The optical module package according to claim 11, wherein the elastic cover part has an elastic cover slanting-side-part corresponding to the cover slanting-side-part, and the elastic cover part is unified with the peak convex-part.

13. The optical module package according to claim 11, wherein a hole part is formed at the cover top-end-part or the cover slanting-side-part of the peak convex-part, wherein the elastic cover part is unified with the peak convex-part by injection molding via the hole part.

* * * * *